United States Patent

Dybel

[15] 3,694,630
[45] Sept. 26, 1972

[54] MECHANICAL EVENTS COUNTER

[72] Inventor: Frank R. Dybel, 521 Mackinaw, Calumet City, Ill. 60409

[22] Filed: April 14, 1970

[21] Appl. No.: 28,448

[52] U.S. Cl. ............235/92 PK, 235/98, 235/92 PD, 235/92 R
[51] Int. Cl. ...............................................G07c 3/10
[58] Field of Search..................................235/92, 98

[56] References Cited

UNITED STATES PATENTS

| | | |
|---|---|---|
| 2,580,192 | 12/1951 | Potter..........................235/92 |
| 3,441,718 | 4/1969 | Hatherell et al.............235/92 |
| 2,486,560 | 11/1949 | Gray.....................235/98 UX |

Primary Examiner—Maynard R. Wilbur
Assistant Examiner—Joseph M. Thesz, Jr.
Attorney—Wolfe, Hubbard, Leydig, Voit & Osann

[57] ABSTRACT

An electronic events counting device including a piezoelectric transducer responsive to the incidence of parts on a detecting plate and operative to produce an electrical signal. The electrical signal is amplified and fed to detecting means which, if the signal is of predetermined magnitude, energizes a coil for sufficient period of time to advance a count display device. After advancement of the count, the coil is automatically deenergized in readiness for a next part to be counted.

14 Claims, 4 Drawing Figures

PATENTED SEP 26 1972 3,694,630
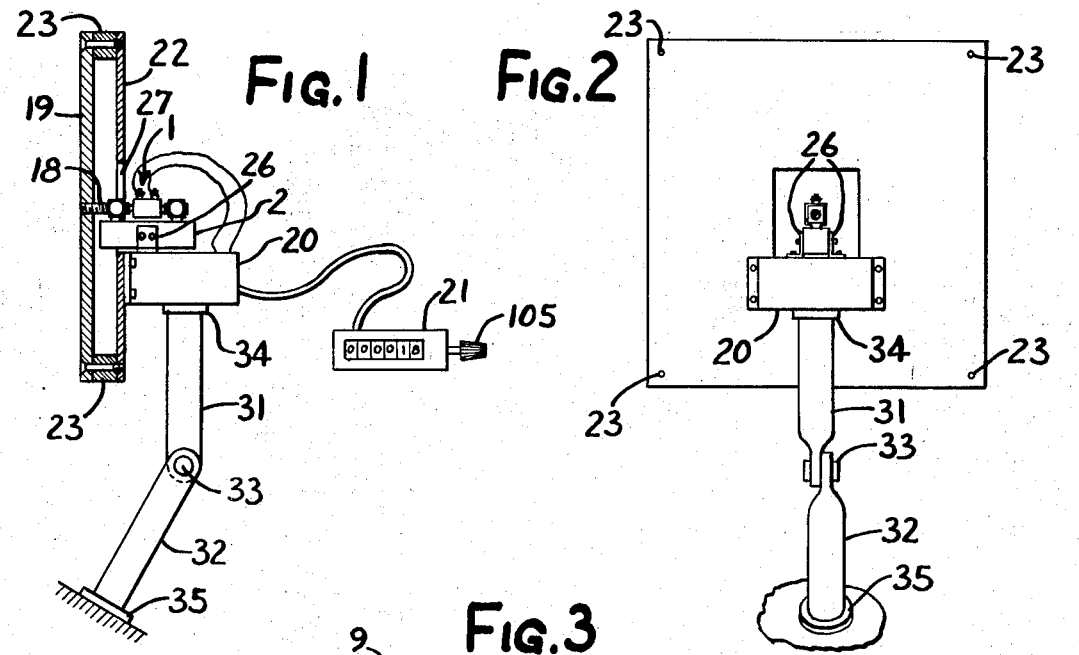
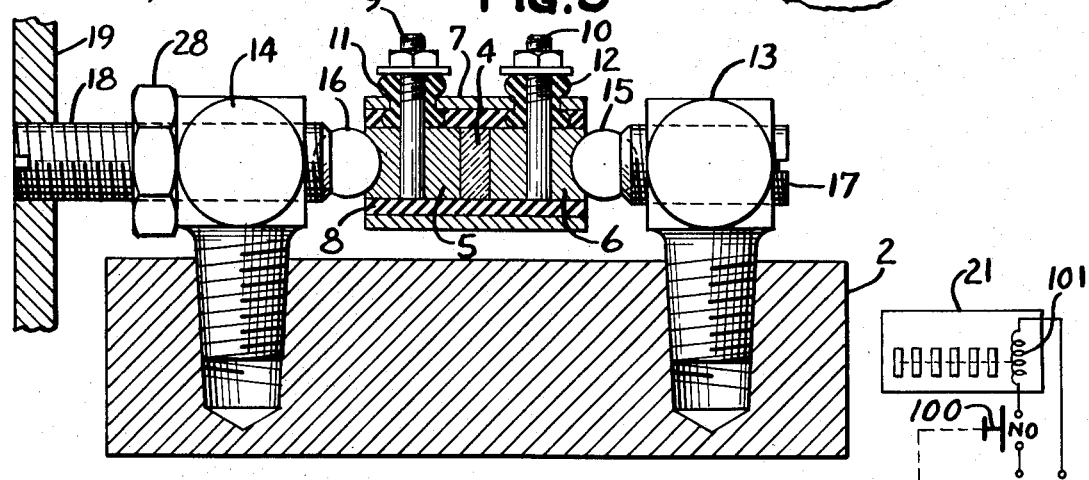
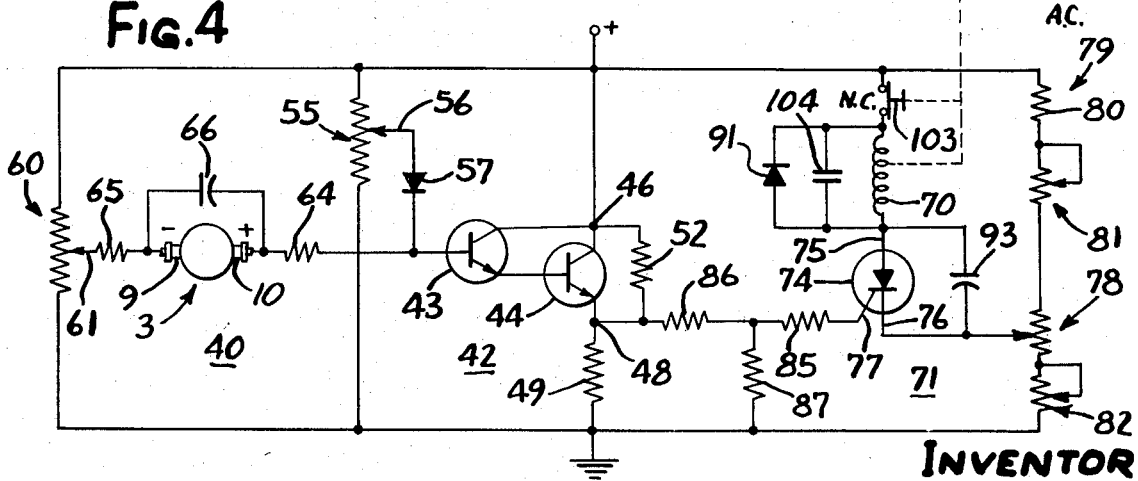
INVENTOR
FRANK R. DYBEL
by: Wolfe, Hubbard, Leydig, Voit & Osann
ATTYS.

MECHANICAL EVENTS COUNTER

This invention relates to devices for counting mechanical events in general, and in particular to parts counters utilizing piezoelectric crystal transducers.

The signal generating capabilities of piezoelectric crystal transducers when subjected to stress have made such transducers the logical choice for many measuring and over-load sensing applications in place of the conventional strain gauges of the resistance type. For example, the crystal may act as an over-load sensor when mounted between two brackets fixed to a force carrying member of a press, an arrangement which is discussed in detail in my co-pending application "Piezoelectric Transducer Senser" Ser. No. 832,542, filed May 12, 1969. The operational characteristics of the piezoelectric crystal presents certain design constraints for the associated detector circuitry when used for high precision applications. A circuit particularly well adapted for use with such a crystal is disclosed in my co-pending application "Piezoelectric Transducer With Improved Sensing Circuit" Ser. No. 873,207 filed Nov. 3, 1969 now U.S. Pat. No. 3,612,966.

The present invention involves the use of a piezoelectric transducer in an application for which it is particularly well adapted, that is, the detection of mechanical events in the form of parts ejected against a plate from a machine. The high sensitivity of the piezoelectric crystal to mechanical stress which is transient in nature makes possible the construction of a counting device with outstanding characteristics.

Specifically, it is an object of the present invention to provide a counting device particularly well suited for counting mechanical events of a transient nature. It is a related object of the present invention to provide such a counting device which is suitable for registering the number of parts ejected from a machine.

Another object of the present invention is the provision of a counting device capable of accurately registering the number of parts ejected from a machine even when said parts are ejected at a high frequency.

A further object of the present invention is the provision of a highly sensitive counting device which is nonetheless rugged and inherently compact. A still further object of the present invention is the provision of a device for counting mechanical events which provides for remote monitoring of the number of events counted.

Other objects and advantages of the present invention will become evident upon reading the following detailed description and upon reference to the drawing in which:

FIG. 1 is a side view, partially in cross section, of a parts ejection counter constructed in accordance with the present invention.

FIG. 2 is a rear view of the parts ejection counter of FIG. 1 without the electrical leads and the count indicator shown in FIG. 1.

FIG. 3 is a cross-sectional view of the piezoelectric transducer used in the present invention showing the adjustable stress-setting means.

FIG. 4 is a diagram of the amplifier-detector circuitry used in the present invention and the count display mechanism employed.

While the invention has been described in connection with the preferred embodiment, it will be understood that I do not intend to be limited to the particular embodiments set forth, but intend, on the contrary, to cover the various alternatives, modifications and equivalents as may be included within the spirit and scope of the invention as defined in the appended claims.

DESCRIPTION OF THE ILLUSTRATED EMBODIMENTS

Turning now to the drawings, there is shown in FIGS. 1–3 a parts ejection counter having a piezoelectric transducer unit 1 particularly adapted for use in the present invention. The transducer unit 1 is shown and described in more detail in applicant's co-pending application Ser. No. 832,542, noted above. As shown herein, the unit is mounted on a metal base 2 and coupled to an impact detecting plate which acts as the working surface of the parts ejection counter. The piezoelectric transducer 1 is shown in FIG. 3 as consisting of a piezoelectric ceramic crystal 4 positioned between a front terminal block 5 and a rear terminal block 6 with the front and rear faces of the crystal in contact with and against the surface of each of the respective terminal blocks. The terminal blocks and crystal are surrounded by a metallic sheath 7 which serves as a magnetic and electric shield. The sheath is slightly larger than the terminal blocks and crystal to provide space for a surrounding layer 8 of an encapsulating and insulating plastic material. Leading from the terminal blocks through the insulating layer 8 and the metallic sheath 7 are terminals 9 and 10 with suitable connections for attachment of leads to the electronic circuit. The leads attached to the terminals are shown in FIG. 1, and may be suitably shielded cables. The terminals 9, 10 and hence the terminal blocks 5, 6 are electrically insulated from the sheath 7 at the passageway therethrough by terminal insulators 11 and 12. The sheath 7 is grounded to the shield of the shielded cables by suitable connections, not shown.

The piezoelectric transducer, as shown in FIG. 3, further includes two brackets 13 and 14. The brackets shown are screw-in type brackets, but the brackets may be fixed to the metal base 2 by other means, e.g., by welding. The ends of the brackets between which the transducer is clamped are provided with ball and socket joints. The balls 15 and 16 engage the terminal blocks 5 and 6, respectively. The brackets are electrically insulated from the terminal blocks in this embodiment by the balls 15 and 16 which are made of a refractory insulating material.

Means are provided for adjusting the stress on the balls of the brackets from either end of the brackets. This feature is provided by a set screw 17 in the end of the rear bracket for adjustment from the rear of the plate as shown most clearly in FIG. 3. Adjustment from the front of the plate is provided by an Allen-type screw 18 in a manner hereinafter described.

In accordance with the present invention, an improved electromechanical counting device is provided which is particularly adaptable to counting parts ejected from a machine, such as a stamping machine. As shown in FIG. 1, the transducer described above is coupled to an impact detecting plate 19 in a manner such that the piezoelectric crystal of the transducer 1 is stressed along a line perpendicular to the plate 19 whenever a part is ejected against the plate. The signals generated by the transducer 1 are fed through a sensing circuit 20 having amplifying and detecting means to ultimately advance an electromechanical counter 21, thereby providing an indication of the number of parts ejected.

Means are provided for mounting the transducer to the detecting plate to give the performance described above. To this end, the detecting plate 19 is attached to a support plate 22 which is in a plane parallel to the detecting plate. The two plates are connected at their corners by metal shock mounts 23 to form a semi-rigid structure The amplifier-detector box 20 is securely connected to the support plate 22 by screws 24 on either side of the box 20 (FIG. 2). A pair of L-shaped brackets 26 are fixed to the top of the amplifier-detector box 20 by welding or the like and are spaced to provide suitable mounting means for the metal transducer base 2. The transducer base 2 is attached to the brackets 26 by welding or other suitable connecting means. The amplifier-detector box 20 is preferably mounted slightly below the center of the support plate 22 such that the transducer assembly 1 is approximately in the center of the plate. This is done to maximize the pressure received by the transducer from the detecting plate 19. An aperture 27 is cut in the center of the support plate 22 to provide a space through which the detecting plate 19 may be connected to the transducer unit 1. The aforesaid connection is provided by the Allen-type screw 18. The screw 18 is designed with a semi-spherical socket at one end thereof adapted for securing the ball 16 of the transducer unit. In adjusting the tension on the ball 16 the screw 18 is turned into the bracket 14 an appropriate distance and then secured by a locking nut 28. The outer end of the screw 18 is firmly attached to the detecting plate 19 by welding after the tension on the ball 16 has been adjusted. However, it will be appreciated that a locking nut behind the plate 19 would serve equally well to secure the connection to the screw 18.

Once the no-load stress on the transducer unit 1 is initially established by the screw 18, any further adjustments required can be more easily made by turning the rear adjustment screw 17.

The parts counter as described thus far may be firmly held in the path of the parts to be ejected in many different ways. In the embodiment shown, an adjustable base is provided formed of two lengths of pipe 31, 32 having ends pivotally connected at a point 33. The opposite ends of the pipes 31, 32 are respectively secured to the amp-detector box 20 by a connector 34 and to the machine or floor by a connector 35. In most instances it will be found desirable to mount the entire unit described above to the very machine from which the parts to be counted are being ejected. The count indicator 21 may be mounted to the same machine or mounted at a distant location to provide remote monitoring of the machine operations.

The piezoelectric transducer produces a high voltage peak output signal, typically as high as several thousand volts, when put under stress during flexing of the detecting plate 19 in response to the impact from an ejected part. In most instances it will be desirable to temper this signal to a degree when it is applied to an electrical indicating or detecting circuit. However, for optimum performance of the crystal transducer, it is desirable to avoid the application of any external biasing currents or voltages to the piezoelectric material itself.

For the purpose of converting the electrical signals generated by the transducer into a drive signal for advancing an electromechanical counter, a sensing circuit in the form of an amplifier and detector is provided which is particularly adapted for use with the piezoelectric transducer described above. This circuit includes amplifying means coupled to the transducer and including two direct-coupled transistors and an input circuit which leaves the transducer effectively bias free during its operation. The transducer output signal is current amplified by the amplifier, but the voltage from the transducer is effectively unchanged while passing through the amplifier. An electromechanical count indicator is controlled by a relay, which in turn is energized when the transducer output signal reaches a predetermined threshhold as determined by a variable potentiometer voltage divider in the relay control circuitry.

Referring then to FIG. 4, there is shown a sensing circuit for use with the transducer 3. The output terminals 9, 10 of the transducer couple the transducer into an input circuit 40 of a current amplifier 42. The amplifier 42 consists of a pair of direct-coupled transistors 43, 44 of the NPN variety. In the configuration shown, the transistors form what is termed in the art as a Darlington pair, with their collectors connected together at a point 46 and with the emitter of the first transistor directly attached to the base of the second transistor. The collector connection 46 is tied directly to a positive D.C. supply terminal 47 while the emitter terminal 48 constitutes the output terminal for the amplifier and is connected to ground through a load resistor 49. A stabilizing resistor 52 having a value at least 10 times larger than the load resistor 49 connects the output terminal 48 to the positive supply bus 47. The Darlington transistor arrangement used herein is particularly attractive for this application, since, when properly biased, the effective dynamic input impedance of the amplifier is equal to the beta (current amplification factor) of the first transistor 43 multiplied by the beta of the second transistor 44. Typical silicon NPN transistors presently available may have current amplification factors of 100 or more when biased in their linear conduction range. Thus, in cascade, two such transistors will provide an amplification factor of 10,000. The input impedance of the amplifier 42 will be approximately 10,000 times the effective load resistance at the emitter terminal 48 which, for present purposes, will be at least 100 kilohms, making the input impedance to the amplifier 42 at least 1,000 megohms.

To obtain such a high input impedance from the amplifier 42 during static conditions, it is necessary to properly bias the input to render the transistors conductive in their linear range. To this end, the input circuit 40 includes a first voltage divider 55 connected between ground and the positive supply terminal 47. The voltage divider 55 in the present instance has the additional feature of being variable through the movement of its wiper arm 56. The divided output voltage present on the wiper arm 56 is applied to the base of the transistor 43 via a diode 57 which is poled to allow bias current to flow into the transistor 43. It is desirable to establish a bias voltage on the wiper arm 56 of the voltage divider which will render the transistors 43 and 44 conductive near the lower current end of their linear region of conduction. Assuming the transistors 43, 44 and the diode 57 to be silicon devices, approximately 1.8 volts must be impressed across their three semiconductor junctions before linear conduction is established. A second voltage divider 60, also in the form of a potentiometer, has a wiper arm 61 for establishing a reference voltage substantially equal to the bias voltage at the base of the first transistor 43 of the amplifier 42. The transducer branch includes the transducer 3 itself, a pair of bandpass control resistors 64, 65 in series with the transducer, and a conditioning capacitor 66 in parallel with the transducer. With the voltages at the opposite ends of the transducer branch being equal in the static condition of the circuit, zero current will flow through the transducer while it is in its inactive condition.

In operation, a stress on the piezoelectric transducer 3 will result in a voltage across the transducer of a polarity indicated in FIG. 4. This voltage will be proportional to the stress applied, but it will be conditioned or limited by the condensor 66 so that its maximum output is approximately 9 volts. Since the condensor 66 is in parallel with the transducer, it does not act as an external biasing element so as to reduce the effectiveness of the transducer. As the voltage across the transducer rises, the output voltage from the amplifier 42 also rises in a 1:1 ratio. However, the current available to drive the emitter load of the amplifier 42 will be several orders of magnitude greater than the transducer current. The only load impressed upon the transducer, other than that of its conditioning capacitor 66, will be the dynamic input impedance of the transistor pair 43, 44 and the reverse impedance of the directional diode 57, both of which are in excess of 10 megohms, providing a high degree of isolation for the transducer.

The piezoelectric crystal is a very sensitive device and therefore prone to producing false output signals in response to the slightest change in stress such as that produced by wind or vibrations of the machine. Therefore, detecting means are provided at the output of the amplifier which detecting means are responsive only to amplified transducer signals which exceed a predetermined threshold voltage.

The detecting means comprises a relay coil 70 selectively controlled by a relay control circuit 71 which is adopted to energize the relay as the current-amplified transducer signal exceeds the predetermined threshold voltage. The relay control circuit includes a controlled rectifier 74 having anode, cathode and gate terminals 75, 76 and 77, respectively, with the cathode terminal 76 referenced to a variable voltage at the wiper of a potentiometer 78. The potentiometer 78 forms one part of a voltage divider 79 connected between ground and the positive supply terminal 47, which divider also includes a fixed resistor 80, a "coarse" control potentiometer 81 and a "fine" control potentiometer 82. The gate terminal 77 of the controlled rectifier 74 is connected to the output terminal 48 of the amplifier 42 through an input resistance 85 and a voltage divider consisting of resistors 86 and 87. Several different factors are operative to determine the transducer voltage necessary to trigger the rectifier 74 into conduction for energizing the relay coil 70. The controlled rectifier 74, typically a silicon device designated as an SCR, is rendered conductive when the voltage at the gate terminal 77 exceeds the reference voltage at the cathode terminal 76 by a fixed amount. Once the rectifier begins conducting, it will remain conducting so long as the current flowing through the anode-cathode junction remains sufficiently high. In the present instance the forward current of the rectifier 74 is limited by the lower resistance branches of the potentiometers 82 and 78 of the voltage divider 79. The variable potentiometers in the divider 79 allow the relay current to be set at the minimum value necessary to maintain conduction in the control circuit, thereby minimizing power consumption. The threshold voltage at which the rectifier will trigger is established by the reference voltage divider 79 and the gate voltage divider consisting of resistances 86 and 87. The potentiometer 78 is intended to be manually engageable by way of a hand dial (not shown) which is calibrated to allow the user to easily choose the stress to be detected.

In accordance with another aspect of the present invention, means are provided for advancing an electromechanical count display in response to the detection of an ejected part by the detector means. For this purpose the relay coil 70 controls a normally open switch 100 to selectively couple an electrical signal to advance the electromechanical count indicator 21. The count indicator 21 may be any one of several types capable of being advanced by an electrical switch external to the unit controlling the application of an AC or DC signal. One counter found particularly suited for this application is manufactured by Redington Counters, Inc. and designated "Model 100 Electro-Mechanical Counter". This counter is only partially illustrated in FIG. 4 and includes a solenoid 101, the actuation of which mechanically advances one of a series of read out wheels. The higher digit wheels are mechanically advanced by the driven wheel.

An SCR will remain conducting even after the trigger signal is removed unless the anode to cathode current is externally interrupted. As a further aspect of the present invention means are provided for interrupting conduction in the SCR upon energization of the relay coil while at the same time holding the relay coil in its operative state long enough to permit the counter to be advanced. To this end the relay coil 70 controls a second switch 103, a normally closed switch, which is in series with the coil 70 between the SCR and the positive supply. Energization of the coil 70 would result in immediate deenergization of the coil 70 were it not for the provision of a delay capacitor 104 in parallel with the coil 70. This capacitor 104 charges during energization of the coil 70 until the switch 103 opens to cut off the charging current. The capacitor then begins to discharge through the coil 70, holding the coil in its energized state for a period of time determined by the value of the capacitor and the hysteresis of the coil itself. The capacitor chosen should be large enough to provide a sufficient delay time to allow the count to advance but small enough to permit the counter to count parts ejected at a high rate.

In operation, an ejected part results in triggering of the SCR 74 to energize the coil 70 and charge the capacitor 104. As the coil 70 reaches full energization, the switch 100 closes and switch 103 opens to stop the flow of current through the SCR. The capacitor begins to discharge through the coil 70 to hold it energized long enough to allow a count to be advanced on the display 21. Finally, the count is advanced and the capacitor has discharged, resulting in deenergization of the coil 70. The switch 103 closes, but since the trigger signal to the SCR was only momentary, conduction through the SCR is not resumed and the counter stands ready to register the next part ejected. At the option of the user, a reset knob 105 (FIG. 1) may be provided to set the indicator to read all zeroes.

While the counter of the present invention has been described in connection with counting events detected by the transducer as a result of parts ejected against a plate it is intended that the scope of the present invention should include the counting of any mechanical events detectable with a piezoelectric transducer, including the counting of operations of a press or similar machine such as is shown in applicants co-pending application Ser. No. 832,542 noted above. In such an embodiment the piezoelectric transducer is mounted on a force carrying member of the press and transmits a signal in response to actuation of the press in a similar manner to that shown and described herein for the preferred embodiment.

I claim as my invention:

1. An electronic counting device for counting mechanical events, said device comprising the combination of a plate positioned to receive an impact in response to the occurrence of each of said events, transducer means coupled to said plate for producing an electrical output signal in response to each impact on said plate, linear amplifier means coupled to said transducer for providing an amplified output signal, count display means, and means including a threshold detector circuit coupled between said amplifier means and said count display means for advancing said display means one count for each impact on said plate, said threshold detector circuit including a bias means and a controlled rectifier having a gate coupled to said amplifying means and a cathode coupled to said bias means, whereby said controlled rectifier is fired only when the amplified output signal exceeds a threshold level established by said bias means and said amplifier means is substantially isolated from said bias means.

2. An electronic counting device according to claim 1 wherein said transducer means includes a piezoelectric crystal for producing said electrical output signal, and further including a biasing means for applying a predetermined bias voltage to said amplifier, and a reference means for supplying a reference voltage substantially equal to said bias voltage, said transducer means being coupled between said biasing means and said reference means whereby substantially zero current flows through said transducer means under quiescent operating conditions.

3. An electronic counting device according to claim 1 wherein said bias means is adjustable to permit selection of an optimum threshold level, and the isolation between said amplifier means and said bias means prevents the selection of the threshold level from having any significant effect on said amplifier means.

4. An electronic counter for counting mechanical events, said counter comprising the combination of a member positioned to be stressed upon the occurrence of each of said events, a piezoelectric transducer coupled to said member for producing an electrical output signal proportional to the stress applied to said member, a normally balanced electrical network having a pair of terminals at substantially equal potentials coupled across said transducer so that said transducer is substantially free of any externally applied bias, an amplifying means coupled to said transducer and to said network for receiving a bias from said network and for amplifying said output signal, a count display means, and means including a threshold detector coupled between said amplifying means and said display means for advancing said display means one count in response to each amplified output signal exceeding a predetermined threshold level selected to distinguish events to be counted from other conditions which might cause stressing of said member.

5. An electronic counter according to claim 4 further including a capacitive load coupled across said transducer for limiting said output signal to a predetermined maximum voltage level, and wherein said amplifier has a high input impedance for substantially isolating said transducer.

6. An electronic counter according to claim 4 wherein said threshold detector comprises a bias means for supplying a voltage to establish said threshold level, and a controlled rectifier including an anode-cathode circuit coupled to said count display means and gate-cathode circuit coupled between said amplifying means and said bias means, whereby said controlled rectifier is fired to advance said display means only when the amplified output signal exceeds said threshold level and said amplifying means is isolated from said bias means by the gate-cathode circuit of said controlled rectifier.

7. An electronic counter for counting mechanical events, said counter comprising the combination of a member positioned to be stressed upon the occurrence of each of said events, a piezoelectric transducer coupled to said member for producing an electrical output signal proportional to said stress, a linear amplifying means coupled to said transducer for supplying an amplified output signal, a count display means, and a threshold detector means coupled between said amplifying means and said display means for advancing said display means one count each time the amplified output signal exceeds a predetermined threshold voltage, said detector means including a bias means for supplying an adjustable voltage to set said threshold level, and a controlled rectifier having a gate-cathode circuit including a gate coupled to said amplifying means and a cathode coupled to said bias means, whereby the gate-cathode circuit of said rectifier affords isolation so that the amplified output signal supplied by said amplifying means is substantially independent of the voltage selected to set said threshold level.

8. A mechanical events counter comprising the combination of an input circuit, including a piezoelectric crystal and a normally balanced electrical network having a pair of terminals at substantially equal potentials coupled across said crystal so that said crystal is substantially free of any externally applied electrical biases and is stressed upon the occurrence of each of said events, for supplying an electrical signal in response to each of said events; a count display means; and a sensing means, including a threshold detecting means, coupled between said transducer means and said display means for advancing said display means one count each time said electrical signal reaches a predetermined threshold level selected to distinguish events to be counted from other conditions which may cause stressing of said crystal.

9. A mechanical events counter according to claim 8 further including capacitive means coupled across said piezoelectric crystal for limiting said electrical signal to a predetermined maximum voltage level.

10. A mechanical events counter according to claim 8 wherein said sensing means further includes an amplifying means coupled between said input circuit and said detecting means for amplifying said signal to provide an amplified signal; and said detecting means includes a bias means for supplying a voltage to establish said threshold level, and a controlled rectifier having an anode-cathode circuit coupled to said display means and a gate-cathode circuit coupled between said amplifying means and said bias means, whereby said rectifier is fired to advance said display means only when said amplified signal reaches said threshold level and said amplifying means is isolated from said bias means by the gate-cathode circuit of said rectifier.

11. An electronic counting device for registering the number of parts ejected from a machine, comprising in combination, a metal plate disposed perpendicular to the path of the parts to be ejected; transducer means including a holding bracket mounted on said plate and a piezoelectric crystal held by said bracket and adapted to be stressed along a line perpendicular to said plate and to produce an electrical signal in response to said stress whenever a part strikes said plate; amplifying means driven by said transducer to produce an output at a voltage proportional to said transducer signal, said amplifying means including an input circuit defining a normally balanced electrical network having a pair of input terminals connected across said transducer means with said terminals being at substantially equal potentials under quiescent conditions so that said transducer means is substantially unbiased under said conditions; detector means coupled to said amplifier and actuated upon the achievement of a predetermined level by said amplifier output; and count display means controlled by said detector means and adapted to advance one count position with each actuation of said detector means.

12. An electronic counting device according to claim 11 wherein said amplifier means further includes a pair of direct coupled emitter follower transistor stages biased into a low state of conduction by said electrical network under quiescent operating conditions so as to produce a maximum dynamic impedance to a transducer signal generated in response to ejection of a part.

13. A device for counting mechanical events comprising in combination, mechanical-to-electrical transducer means detecting events to be counted and producing an electrical signal in response thereto; threshold detector means including a silicon controlled rectifier which is rendered conductive in response to the achievement of a predetermined amplitude by said transducer signal; a source of alternating current; a count display device adapted to be advanced one count with each successive application of alternating current thereto; relay means including a coil, a normally closed contact pair for conducting power for said controlled rectifier, and a normally open contact pair coupled between said alternating current source and said count display device, said coil being energized in response to conduction in said detector means to change the states of said contact pairs and thereby simultaneously (a) connect said alternating current source to said display device to advance the count, and (b) render said detector means non-conductive in readiness for the next transducer signal; and time delay means for maintaining said coil energized for a predetermined interval after conduction in said detector means has ceased.

14. A counting device according to claim 11 wherein said time delay means is a capacitor in parallel with said relay coil, said capacitor being charged during conduction in said rectifier and discharged to maintain energization of said coil after conduction in said rectifier has ceased.

* * * * *